June 24, 1947.     R. P. LEWIS     2,422,739
DRIVING AXLE CONSTRUCTION FOR INDEPENDENTLY SPRUNG VEHICLE WHEELS
Filed Aug. 12, 1944     2 Sheets-Sheet 2
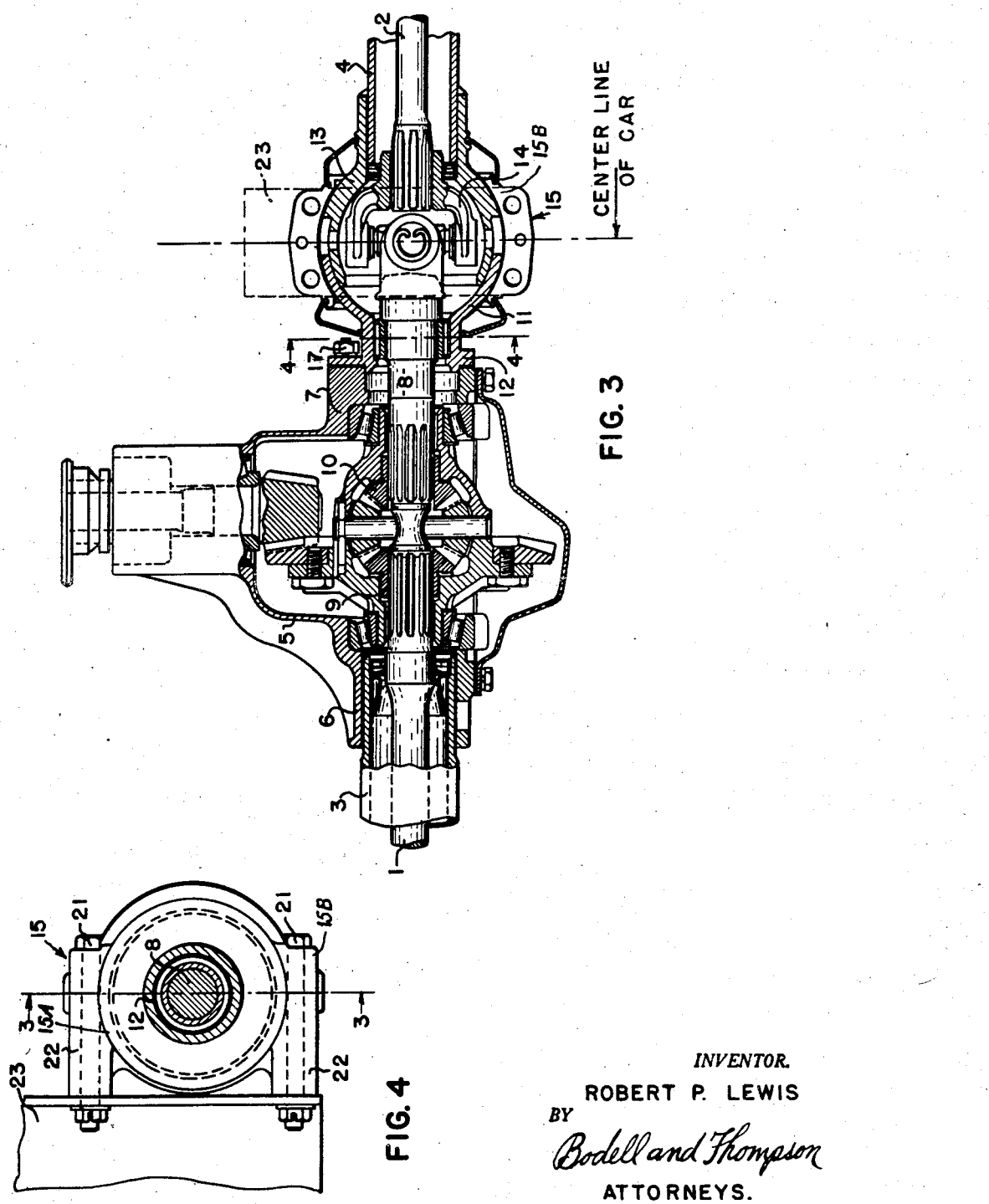
INVENTOR.
ROBERT P. LEWIS
BY
Bodell and Thompson
ATTORNEYS.

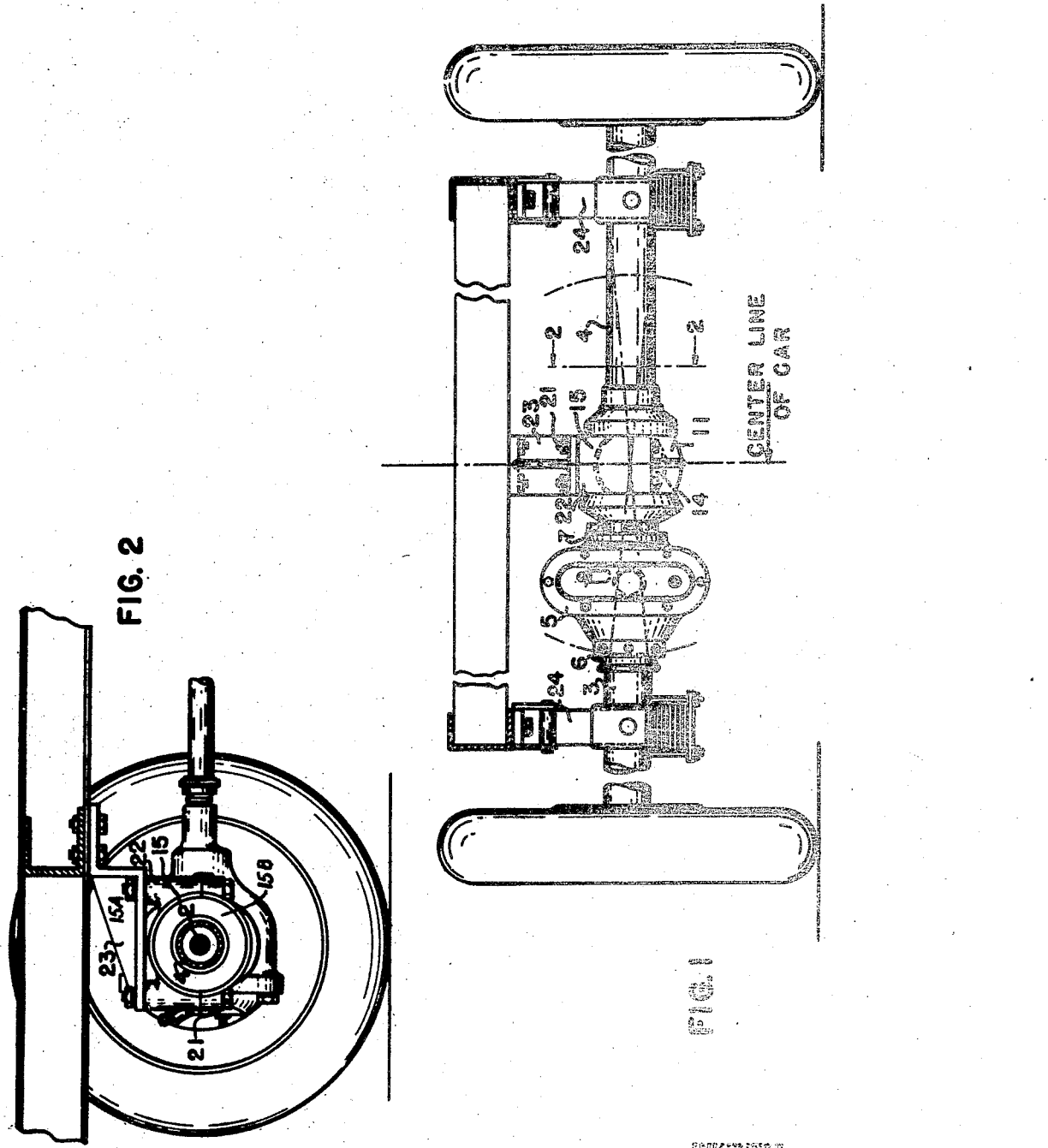

Patented June 24, 1947

2,422,739

UNITED STATES PATENT OFFICE 2,422,739

DRIVING AXLE CONSTRUCTION FOR INDEPENDENTLY SPRUNG VEHICLE WHEELS

Robert P. Lewis, Toledo, Ohio, assignor to Spicer Manufacturing Corporation, Toledo, Ohio, a corporation of Virginia Application August 12, 1944, Serial No. 549,267

6 Claims. (Cl. 180—73)

1

This invention relates to driving axle constructions for independently sprung vehicle wheels of motor vehicles, and has for its general object a universal joint arrangement by which a single universal joint is used about which the drive axle sections articulate during the up and down movement of the vehicle wheels in traveling over the road or rough surface and also a support for the driving axle sections or assembly between that universal joint and the body or frame of the vehicle. It also more specifically has for its object the means for supporting such universal joint from the body or frame of the vehicle and the relative arrangement of the joint to its support and the differential gear casing.

Other objects appear throughout the specification.

The invention consists in the novel features and in the combinations and constructions hereinafter set forth and claimed.

In describing this invention, reference is had to the accompanying drawings, in which like characters designate corresponding parts in all the views.

Figure 1 is an elevation of this driving axle assembly, contiguous parts of the chassis of the vehicle being also shown.

Figure 2 is a sectional view on the plane of line 2—2, Figure 1.

Figure 3 is an enlarged detail sectional view of parts seen in Figure 1, showing the differential gear and contiguous parts in longitudinal section or a sectional view on the plane of line 3—3, Figure 4.

Figure 4 is a side elevation of the universal joint housing or a sectional view on the plane of line 4—4, Figure 3.

This drive axle construction includes drive shaft sections 1, 2, tubular housings 3, 4 enclosing the same, an intermediate shaft 8 between the drive shaft sections 1, 2, a universal joint between the intermediate shaft 8 and one of the drive shaft sections, as the shaft section 2, a hollow universal joint, enclosing the former universal joint, and having a hub bearing on the intermediate shaft 8, a differential gearing between the other shaft section 1 and the intermediate shaft 8, and means for supporting the hollow universal joint and hence the axle assembly to the central portion thereof, from the vehicle frame.

A housing or socket for the sections of the hollow universal joint is supported from the vehicle frame.

5 designates the housing for the differential gearing, it being mounted at 6 at one side on

2 one of the tubular housings, as the housing 3. It is mounted on its other side at 7 on the hub of one section 11 of the hollow universal joint concentric with the intermediate shaft 8, the other section 13 of this hollow universal joint is mounted on the other tubular housing 4. One of the side gears 9 of the differential gearing is splined on one of the drive shaft sections, here shown as the section 1, and the other side gear 10 is splined on the intermediate shaft 8. The section 11 of the hollow universal joint has its hub 12 provided with a bearing on the intermediate shaft 8, and the other section 12 of the hollow universal joint is mounted on the tubular housing for the other drive shaft section 2. These universal joint sections enclose and are arranged concentric with the universal joint 14 and the intermediate shaft 8 and the drive shaft section 2.

15 designates an outer housing or socket for the hollow universal joint sections 11 and 13. This is supported from a frame, and hence the entire driving axle assembly is supported from the frame, as by a bracket, through the housing for the universal joint sections.

The axle sections 1, 2 have spindles at their outer ends on which the drive wheels of the vehicle are mounted. The hub 12 of the universal joint section 11 is secured to the hub of the differential mounted on the intermediate shaft 8 by fastening members, as nuts 17 threading on studs extending parallel to the axis of the intermediate shaft 8 out of the hub of the differential housing.

As seen in Figure 4, the supporting means or socket 15 for the universal joint sections 11 and 13 is formed of two opposed half sections 15A and 15B in order to be applied to the universal joint sections 11 and 13, the opposed sections being hemi-spherical or having hemi-spherical inner faces. These sections and the sections of the socket member 15 are secured together by fastening members, as bolts 21, located at diametrically opposite sides of the socket member 15 and extending in a general tangential direction on the front and rear sides thereof, these fastening members extending through bosses 22 for a purpose to be presently described. The housing 15 is generally spherical in form to receive the spherical sections 11 and 13 of the universal joint. Its outer face is also generally spherical but not necessarily so.

The means for supporting the axle construction from the vehicle in addition to vehicle springs, supports the axle construction from the universal joint socket member or housing 15.

This support may be a plate or bracket 23 abutting against the ends of the bosses 22 and secured to the body or frame of the vehicle or a cross bar thereof in any suitable manner. The bolts 21 which secure the sections 15A, 15B of the socket member or casing 15 also extend through this bracket or plate 23 and serve to secure the socket member 15 to the bracket 23, and hence support the axle construction at the intermediate part thereof. The outer ends of the drive shaft sections or their housings are spring supported or suspended in any well known manner, as by semi-elliptical springs 24. The differential gear is thus mounted to have an up and down movement during the vehicle spring action, about the axes of the sections 11 and 13 of the universal joint and also about the center of the universal joint 14, and only one universal joint is used between the differential gear and the shaft sections 1, 2, it being understood that if the drive wheels mounted on the spindles at the outer ends of the axle sections 1, 2 are also steering wheels, there are universal joints between such spindles and the outer ends of the shafts 1, 2.

By this construction, the assembly of the differential gear housing and of the universal joint between the differential gear housing and the tubular housing for one of the drive shafts, is particularly simple, compact and strong, and also the supporting of this universal joint between the differential gear housing and the tubular housing for one of the drive axle sections is strong and compact and readily applied to the vehicle or the axle construction, as a whole readily applied to the vehicle.

What I claim is:

1. In a drive axle construction for independently sprung vehicle wheels, the combination of drive shaft sections, tubular housings enclosing the same, an intermediate shaft, a differential gearing including a housing mounted at one side on the tubular housing for one of the drive shaft sections, a hollow universal joint between the other side of the differential gear housing and the tubular housing for the other drive shaft section, the hollow universal joint having a hub on which the other side of the differential gear housing is mounted, the side gears of the differential gearing being mounted respectively on said one of the drive shaft sections and on the intermediate shaft, a universal joint between the intermediate shaft and said other drive shaft section, located within and concentric with the former universal joint, a housing for the hollow universal joint, separate and spaced from, and independent of, the differential gear housing, and means for supporting the hollow universal joint housing from the vehicle frame independently of the differential gear housing and the drive shaft housing.

2. In a drive axle construction for independently sprung vehicle wheels, the combination of drive shaft sections, tubular housings enclosing the same, an intermediate shaft, a differential gearing including a housing mounted at one side on the tubular housing for one of said shaft sections, a hollow universal joint between the other side of the differential gear housing and the tubular housing for the other drive shaft section, having a hub on which the other side of the differential gear housing is mounted, a universal joint between the intermediate shaft and the other drive shaft section, located within and concentric with the hollow universal joint, a housing for the hollow universal joint enclosing the same and consisting of opposing sections forming a socket in which the hollow universal joint works, the hollow universal joint housing being separate and spaced from, and independent of, the differential gear housing, and means for carrying the hollow universal joint housing from the vehicle frame independently of the differential gear housing, and the drive shaft housings, whereby the differential gear housing and the shaft housings are carried by the hollow universal joint housing.

3. In a drive axle construction for independently sprung vehicle wheels, the combination of drive shaft sections, tubular housings enclosing the same, an intermediate shaft, a differential gearing including a housing mounted at one side on the tubular housing for one of said shaft sections, a hollow universal joint between the other side of the differential gear housing and the tubular housing for the other drive shaft section, having a hub on which the other side of the differential gear housing is mounted, a universal joint between the intermediate shaft and the other drive shaft section, located within and concentric to the hollow universal joint, a housing for the hollow universal joint including separable sections separable along a plane extending lengthwise of the lineal axis of the hollow universal joint, a support for attachment to the vehicle body, means for securing the housing for the hollow universal joint to the support independently of the differential gear housing and the housing for the drive shaft sections, and vehicle spring means connected to the housing for the drive shaft sections.

4. In a drive axle construction for independently sprung vehicle wheels, the combination of drive shaft sections, tubular housings enclosing the same, an intermediate shaft, a differential gearing including a housing mounted at one side on the housing for one of the drive shaft sections, a hollow universal joint including a section having a hub on which the other side of the differential gear housing is mounted, the other section of the hollow universal joint being mounted upon the tubular housing for the other drive shaft section, the side gears of the differential being mounted respectively on said one drive shaft section and on the intermediate shaft, a universal joint between the intermediate shaft and said other drive shaft section and located concentric with and within the hollow universal joint, a housing for the hollow universal joint enclosing the same and consisting of opposing sections forming a socket for the sections of the hollow universal joint and being separate and spaced from and independent of the differential gear housing and the housings for the drive shaft sections, and a bracket for supporting the central portion of the drive shaft assembly from the vehicle frame extending at one side of one of the sections of the housing for the hollow universal joint and abutting against and secured to the same.

5. In a drive axle construction for independently sprung vehicle wheels, the combination of drive shaft sections, tubular housings enclosing the same, an intermediate shaft, a differential gearing including a housing mounted at one side of the housing for one of the drive shaft sections, a hollow universal joint including a section having a hub on which the other side of the differential gear housing is mounted, the other section of the hollow universal joint being mounted upon the tubular housing for the other drive shaft section, the side gears of the differential being mounted respectively on said one drive shaft section and on the intermediate shaft, a universal joint between the intermediate shaft and said other drive shaft section and located concentric with and within the hollow universal joint, a housing for the hollow universal joint enclosing the same and consisting of opposing sections forming a socket for the sections of the hollow universal joint and being separate and spaced from and independent of the differential gear housing and the housings for the drive shaft sections, a bracket for supporting the central portion of the drive shaft assembly from the vehicle frame, extending at one side of one of the sections of the housing for the hollow universal joint and abutting against and secured to the same, and fastening members extending transversely through the sections of the housing for the hollow universal joint on diametrically opposite sides thereof, said fastening members coacting with the bracket to hold the sections of the universal joint housing together and also to secure the housing to the bracket.

6. In a drive axle construction for independently sprung vehicle wheels, the combination of drive shaft sections, tubular housings enclosing the same, an intermediate shaft, a differential gearing including a housing mounted at one side on the housing for one of the drive shaft sections, a hollow universal joint including a section having a hub on which the other side of the differential gear housing is mounted, the other section of the hollow universal joint being mounted upon the tubular housing for the other drive shaft section, the side gears of the differential being mounted respectively on said one drive shaft section and on the intermediate shaft, a universal joint between the intermediate shaft and said other drive shaft section and located concentric with and within the hollow universal joint, a housing for the hollow universal joint enclosing the same and consisting of opposing sections forming a socket for the sections of the hollow universal joint and being separate and spaced from and independent of the differential gear housing and the housings for the drive shaft sections, a bracket for supporting the central portion of the drive shaft assembly from the vehicle frame extending at one side of one of the sections of the housing for the hollow universal joint and abutting against and secured to the same, the sections of the universal joint housing being formed with bosses on diametrically opposite sides thereof, the bosses on one of the sections of the hollow universal joint abutting against the bracket, and retaining members extending through the bosses of the sections and through the bracket.

ROBERT P. LEWIS.

REFERENCES CITED

The following references are of record in the file of this patent:

FOREIGN PATENTS

| Number | Country | Date |
|---|---|---|
| 12,377 | Great Britain | Nov. 2, 1911 |
| 615,894 | France | Jan. 18, 1927 |